United States Patent
Ito et al.

(10) Patent No.: US 12,169,030 B2
(45) Date of Patent: Dec. 17, 2024

(54) PIEZOELECTRIC VALVE

(71) Applicants: SATAKE CORPORATION, Tokyo (JP); MECHANO TRANSFORMER CORPORATION, Tokyo (JP)

(72) Inventors: Takafumi Ito, Tokyo (JP); Sze Keat Chee, Tokyo (JP)

(73) Assignees: SATAKE CORPORATION, Tokyo (JP); MECHANO TRANSFORMER CORPORATION, Tokyo (JP)

(*) Notice: Subject to any disclaimer, the term of this patent is extended or adjusted under 35 U.S.C. 154(b) by 35 days.

(21) Appl. No.: 18/025,463

(22) PCT Filed: Sep. 10, 2021

(86) PCT No.: PCT/JP2021/033258
§ 371 (c)(1),
(2) Date: Mar. 9, 2023

(87) PCT Pub. No.: WO2022/059607
PCT Pub. Date: Mar. 24, 2022

(65) Prior Publication Data
US 2024/0011573 A1    Jan. 11, 2024

(30) Foreign Application Priority Data
Sep. 15, 2020  (JP) .................. 2020-154308

(51) Int. Cl.
*F16K 31/00* (2006.01)
*G05D 16/20* (2006.01)
*H02N 2/04* (2006.01)

(52) U.S. Cl.
CPC .......... *F16K 31/004* (2013.01); *F16K 31/007* (2013.01); *G05D 16/2086* (2013.01); *H02N 2/043* (2013.01); *Y10T 137/7826* (2015.04)

(58) Field of Classification Search
CPC .... F16K 31/004; F16K 31/005; F16K 31/006; F16K 31/008; H02N 2/043; H10N 30/20; H10N 30/88
(Continued)

(56) References Cited

U.S. PATENT DOCUMENTS 6,024,340 A * 2/2000 Lazarus ............... F16K 31/004
                                                      310/365
6,581,638 B2 * 6/2003 Frisch ................. F16K 31/004
                                                      137/596.17
(Continued)

FOREIGN PATENT DOCUMENTS

DE      3608550 A1    9/1987
JP   2006-522298 A    9/2006
(Continued)

*Primary Examiner* — Robert K Arundale
(74) *Attorney, Agent, or Firm* — Faegre Drinker Biddle & Reath LLP (57) ABSTRACT

A piezoelectric valve including an actuator that drives a valve body; a valve seat plate including a valve seat that is adapted to be positioned in contact with and away from the valve body, and a discharge passage; and a body case that houses the valve seat plate, in which the actuator includes a proximal portion fixed to the valve seat plate, a piezoelectric element having one end portion connected to an attachment face of the proximal portion and extending in a first longitudinal direction, a support portion integrally formed with the proximal portion, the support portion being arranged side-by-side with the piezoelectric element and extending in a second longitudinal direction crossing the first longitudinal direction, an operating portion connected to another end portion of the piezoelectric element and to a distal end portion of the support portion.

6 Claims, 5 Drawing Sheets

(58) Field of Classification Search
USPC .................................................. 251/129.06
See application file for complete search history.

(56) References Cited

U.S. PATENT DOCUMENTS

| | | | |
|---|---|---|---|
| 8,381,765 B2* | 2/2013 | Reuter | F16K 31/006 |
| | | | 251/300 |
| 9,097,359 B2* | 8/2015 | Ito | F16K 31/02 |
| 2015/0226347 A1* | 8/2015 | Reuter | F16K 31/007 |
| | | | 251/129.06 |
| 2016/0334028 A1* | 11/2016 | Ito | F15B 13/0825 |
| 2018/0250714 A1* | 9/2018 | Ito | B07C 5/3425 |
| 2020/0144477 A1 | 5/2020 | Chee et al. | |

FOREIGN PATENT DOCUMENTS

| | | |
|---|---|---|
| JP | 2015-137664 A | 7/2015 |
| JP | 2016-061412 A | 4/2016 |
| JP | 2017-51894 A | 3/2017 |
| JP | 2020-051476 A | 4/2020 |
| JP | 6893710 B1 | 6/2021 |
| WO | WO-2004/090399 A2 | 10/2004 |
| WO | WO-2019/009035 A1 | 1/2019 |

\* cited by examiner

PIEZOELECTRIC VALVE

CROSS REFERENCE TO PRIOR APPLICATIONS

This application is the National Stage of International Application No. PCT/JP2021/033258 filed Sep. 10, 2021 and claims benefit of Japanese Application No. 2020-154308 filed Sep. 15, 2020, which are herein incorporated by reference in their entirety.

TECHNICAL FIELD

The present invention relates to a piezoelectric valve that opens and closes a valve using a displacement of a piezoelectric element.

BACKGROUND ART

Conventionally, a piezoelectric valve that opens and closes a valve using a displacement of a piezoelectric element, and ejects compressed gas is known as disclosed in Patent Literature 1, for example.

The piezoelectric valve disclosed in Patent Literature 1 includes an actuator that uses the characteristics of a piezoelectric element having excellent high-speed responsiveness. In the piezoelectric valve disclosed in Patent Literature 1, the actuator includes a displacement magnification mechanism that magnifies a small displacement of the piezoelectric element based on the lever principle.

Piezoelectric valves have excellent responsiveness. Therefore, the piezoelectric valve is used as an ejector valve of an optical sorter designed to sort grains, such as rice grains, to remove defective grains. In such a case, non-defective grains are rarely removed together with the defective grains. There has also been a finding obtained from experiences and an empirical rule that the mixing rate of defective grains on the side of the removed defective grains is higher than that of an electromagnetic valve.

By the way, when a piezoelectric valve is used as an ejector valve of an optical sorter or the like, the piezoelectric valve is attached directly to and continuously with a manifold having an internal space to be supplied with compressed air from a compressed air source as disclosed in Patent Literature 2, for example. In such a case, a number of nozzle holes are opened at the tip end of the ejector.

However, the piezoelectric valve disclosed in Patent Literature 1 is configured such that a valve seat plate having an actuator fixed thereto is housed within a case of a valve body, and the actuator includes a displacement magnification mechanism with a complex structure including an arm, a leaf spring, and the like. Therefore, as the thickness (width) dimension of the actuator cannot be reduced, there is a problem in that when a plurality of air outlet ports are provided, the pitch of the air outlet ports is difficult to reduce.

CITATION LIST

Patent Literature

Patent Literature 1: Japanese Patent Laid-Open No. 2017-51894
Patent Literature 2: Japanese Patent Laid-Open No. 2015-137664

SUMMARY OF INVENTION

Technical Problem

Accordingly, an object of the present invention is to provide a piezoelectric valve in which the pitch of gas outlet ports can be reduced.

Solution to Problem

To achieve the foregoing object, an embodiment of the present invention is a piezoelectric valve including a plurality of actuators that respectively drive a plurality of valve bodies individually in parallel planes; a valve seat plate including a plurality of valve seats that are respectively adapted to be positioned in contact with and away from the plurality of valve bodies individually, and a plurality of discharge passages, the valve seat plate having the plurality of actuators fixed thereto; and a body case that houses the valve seat plate, in which each of the plurality of actuators includes a proximal portion fixed to the valve seat plate, a piezoelectric element having one end portion connected to an attachment face of the proximal portion and extending in a first longitudinal direction, a support portion integrally formed with the proximal portion, the support portion being arranged side-by-side with the piezoelectric element and extending in a second longitudinal direction crossing the first longitudinal direction, an operating portion connected to another end portion of the piezoelectric element and to a distal end portion of the support portion, the operating portion being adapted to be displaced in a displacement direction different from each of the first longitudinal direction and the second longitudinal direction along with expansion and contraction of the piezoelectric element, and the valve body provided on a side of the operating portion along the displacement direction, the valve body being adapted to be driven in response to a displacement of the operating portion, and in which the body case includes a gas supply port through which compressed gas is supplied into the body case, and a plurality of gas outlet ports that individually discharge the compressed gas supplied from the gas supply port via the respective discharge passages of the valve seat plate while the plurality of valve bodies and the plurality of valve seats are respectively positioned away from each other.

In an embodiment of the present invention, the valve seat plate is preferably fixed within the body case so as to allow the discharge passages to communicate with the respective gas outlet ports of the body case.

In an embodiment of the present invention, the operating portion of each of the plurality of actuators is preferably displaced in a displacement direction different from each of the first longitudinal direction and the second longitudinal direction along with expansion and contraction of the piezoelectric element, the displacement direction being a direction within a plane parallel with a plane including the first longitudinal direction and the second longitudinal direction.

In an embodiment of the present invention, the valve seat plate preferably includes a valve seat portion having the valve seats and the discharge passages formed therein, the plurality of valve seats being provided on opposite sides of the valve seat portion, and the plurality of actuators are preferably fixed to the valve seat plate such that the valve bodies of the respective actuators face the respective valve seats.

In an embodiment of the present invention, the valve seat plate preferably includes a valve seat portion having the valve seats and the discharge passages formed therein, the plurality of valve seats being provided on opposite sides of the valve seat portion in a staggered manner such that the valve seats partially overlap in a width direction, and the plurality of actuators are preferably fixed to the valve seat plate such that the valve bodies of the respective actuators face the respective valve seats.

In an embodiment of the present invention, the plurality of valve seats are preferably arranged side-by-side in a width direction on the respective sides of the valve seat portion (i.e., the thickness (width) direction of the valve seat plate).

To achieve the foregoing object, an embodiment of the present invention is a piezoelectric valve including an actuator that drives a valve body; a valve seat plate including a valve seat that is adapted to be positioned in contact with and away from the valve body, and a discharge passage, the valve seat plate having the actuator fixed thereto; and a body case that houses the valve seat plate, in which the actuator includes a proximal portion fixed to the valve seat plate, a piezoelectric element having one end portion connected to an attachment face of the proximal portion and extending in a first longitudinal direction, a support portion integrally formed with the proximal portion, the support portion being arranged side-by-side with the piezoelectric element and extending in a second longitudinal direction crossing the first longitudinal direction, an operating portion connected to another end portion of the piezoelectric element and to a distal end portion of the support portion, the operating portion being adapted to be displaced in a direction different from each of the first longitudinal direction and the second longitudinal direction along with expansion and contraction of the piezoelectric element, and the valve body provided on a side of the operating portion along the displacement direction, the valve body being adapted to be driven in response to a displacement of the operating portion, and in which the body case includes a gas supply port through which compressed gas is supplied into the body case, and a gas outlet port that discharges the compressed gas supplied from the gas supply port via the discharge passage of the valve seat plate while the valve body and the valve seat are positioned away from each other.

In an embodiment of the present invention, the valve seat plate is preferably fixed within the body case so as to allow the discharge passage to communicate with the gas outlet port of the body case.

In an embodiment of the present invention, the operating portion of the actuator is preferably displaced in a displacement direction different from each of the first longitudinal direction and the second longitudinal direction along with expansion and contraction of the piezoelectric element, the displacement direction being a direction within a plane parallel with a plane including the first longitudinal direction and the second longitudinal direction.

In an embodiment of the present invention, the support portion preferably includes an intermediate portion extending in the second longitudinal direction, the intermediate portion having a narrow portion.

In an embodiment of the present invention, the valve seat preferably includes a valve seat face having a plurality of annular protruding portions in which the respective discharge passages are open, and the valve body is preferably adapted to move into contact with and away from the plurality of annular protruding portions of the valve seat face.

Advantageous Effects of Invention

In the piezoelectric valve of an embodiment of the present invention, each of the plurality of actuators includes a proximal portion fixed to the valve seat plate, a piezoelectric element having one end portion connected to an attachment face of the proximal portion and extending in a first longitudinal direction, a support portion integrally formed with the proximal portion, the support portion being arranged side-by-side with the piezoelectric element and extending in a second longitudinal direction crossing the first longitudinal direction, an operating portion connected to another end portion of the piezoelectric element and to a distal end portion of the support portion, the operating portion being adapted to be displaced in a displacement direction different from each of the first longitudinal direction and the second longitudinal direction along with expansion and contraction of the piezoelectric element, and the valve body provided on a side of the operating portion along the displacement direction, the valve body being adapted to be driven in response to a displacement of the operating portion. Thus, the actuator includes a displacement magnification mechanism with a simple structure, which allows the thickness (width) dimension of the actuator to be reduced than those of the conventional actuators.

Therefore, according to the piezoelectric valve of an embodiment of the present invention, the pitch of the gas outlet ports can be reduced in comparison with those of the conventional piezoelectric valves.

In addition, in the piezoelectric valve of an embodiment of the present invention, since the actuator includes the support portion integrally formed with the proximal portion, the number of components used can be reduced, and the assembly of the actuator can be simplified.

The piezoelectric valve of an embodiment of the present invention is configured such that the valve seat plate includes a valve seat portion having valve seats and discharge passages formed therein, the plurality of valve seats being provided on opposite sides of the valve seat portion, and the plurality of actuators are fixed to the valve seat plate such that the valve bodies of the respective actuators face the respective valve seats, whereby it is possible to reduce the thickness (width) dimension of the valve seat plate having the plurality of actuators fixed thereto. Thus, the pitch of the gas outlet ports can be reduced in comparison with those of the conventional piezoelectric valves.

The piezoelectric valve of an embodiment of the present invention is configured such that the valve seat plate includes a valve seat portion having valve seats and discharge passages formed therein, the plurality of valve seats being provided on opposite sides of the valve seat portion in a staggered manner such that the valve seats partially overlap in the width direction, and the plurality of actuators are fixed to the valve seat plate such that the valve bodies of the respective actuators face the respective valve seats, whereby the plurality of actuators are fixed to the opposite sides of the valve seat portion of the valve seat plate such that the actuators partially overlap in the thickness (width) direction of the valve seat plate. Thus, it is possible to further reduce the thickness (width) dimension of the valve seat plate having the plurality of actuators fixed thereto, and further reduce the pitch of the gas outlet ports in comparison with those of the conventional piezoelectric valves.

The piezoelectric valve of an embodiment of the present invention is configured such that the plurality of valve seats are arranged side-by-side on opposite sides of the valve seat portion in the thickness (width) direction of the valve seat plate, whereby at least four actuators can be fixed to a single valve seat plate. Thus, it is possible to reduce the thickness (width) dimension of the valve seat plate for each actuator, and thus reduce the pitch of the gas outlet ports in comparison with those of the conventional piezoelectric valves.

The piezoelectric valve of an embodiment of the present invention is configured such that the actuator includes a proximal portion fixed to the valve seat plate, a piezoelectric element having one end portion connected to an attachment face of the proximal portion and extending in a first longitudinal direction, a support portion integrally formed with the proximal portion, the support portion being arranged side-by-side with the piezoelectric element and extending in a second longitudinal direction crossing the first longitudinal direction, an operating portion connected to another end portion of the piezoelectric element and to a distal end portion of the support portion, the operating portion being adapted to be displaced in a direction different from each of the first longitudinal direction and the second longitudinal direction along with expansion and contraction of the piezoelectric element, and the valve body provided on a side of the operating portion along the displacement direction, the valve body being adapted to be driven in response to a displacement of the operating portion. Thus, the actuator includes a displacement magnification mechanism with a simple structure, which allows the thickness (width) dimension of the actuator to be reduced than those of the conventional actuators.

Therefore, according to the piezoelectric valve of the present invention, when a plurality of actuators are provided, the pitch of the gas outlet ports can be reduced in comparison with those of the conventional piezoelectric valves.

The piezoelectric valve of an embodiment of the present invention is configured such that the support portion includes an intermediate portion extending in the second longitudinal direction, the intermediate portion having a narrow portion, whereby a displacement of the operating portion can be magnified.

The piezoelectric valve of an embodiment of the present invention is configured such that the valve seat includes a valve seat face having a plurality of annular protruding portions in which the respective discharge passages are open, and the valve body is adapted to move into contact with and away from the plurality of annular protruding portions of the valve seat face, whereby it is possible to increase the entire circumferential length of the openings of the discharge passages, and thus increase the amount of gas discharged from the gas outlet ports of the body case via the discharge passages while the valve body and the valve seat are positioned away from each other.

DESCRIPTION OF EMBODIMENTS

Embodiments of the present invention will be described with reference to the drawings.

Embodiment 1

Figure 1:
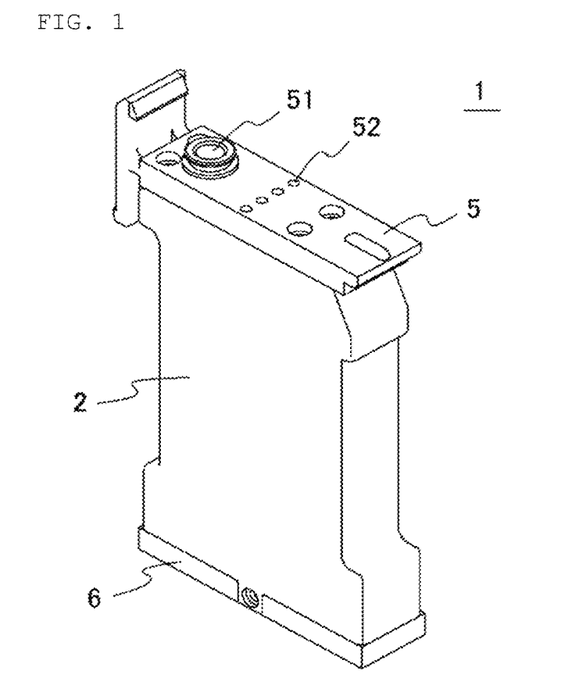
FIG. 1 is a perspective view of a piezoelectric valve.
Figure 2:
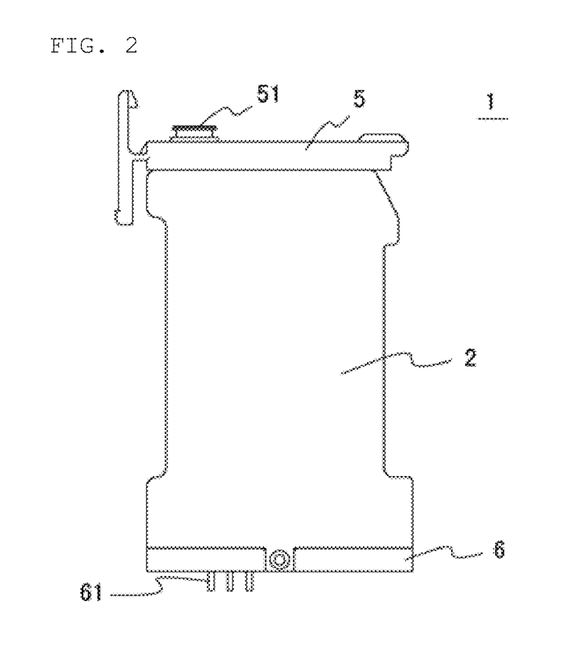
FIG. 2 is a view illustrating the piezoelectric valve.

FIG. 1 is a perspective view of a piezoelectric valve. FIG. 2 is a view illustrating the piezoelectric valve seen from the side of its side face.

In Embodiment 1 of the present invention, a piezoelectric valve 1 includes a valve body 2, an actuator 3 described below, and a valve seat plate 4 described below that is arranged in the valve body 2 in a state where the actuator 3 is fixed to the valve seat plate 4.

The valve body 2 is a case with an open rear face (i.e., bottom face in FIGS. 1 and 2), and includes an internal gas pressure chamber to be supplied with compressed gas from an external compressed gas supply source (not illustrated).

The front face (i.e., the top face in FIGS. 1 and 2) of the valve body 2 is provided with a connector portion 5 for attaching the valve body 2 to a manifold (not illustrated) having an internal space to be supplied with compressed gas from a compressed gas source.

The front face of the connector portion 5 includes a gas inlet port 51 for sucking compressed gas into the valve body 2, and a plurality of gas outlet ports 52 for discharging the compressed gas.

The front face of the valve body 2 includes a gas supply port (not illustrated) communicating with the gas inlet port 51 of the connector portion 5, and a plurality of gas outlet ports (not illustrated) communicating with the respective gas outlet ports 52.

The rear face of the valve body 2 is closed with a cover body 6. A wire connector 61 for feeding power to a piezoelectric element is arranged on the cover body 6.

Figure 3:
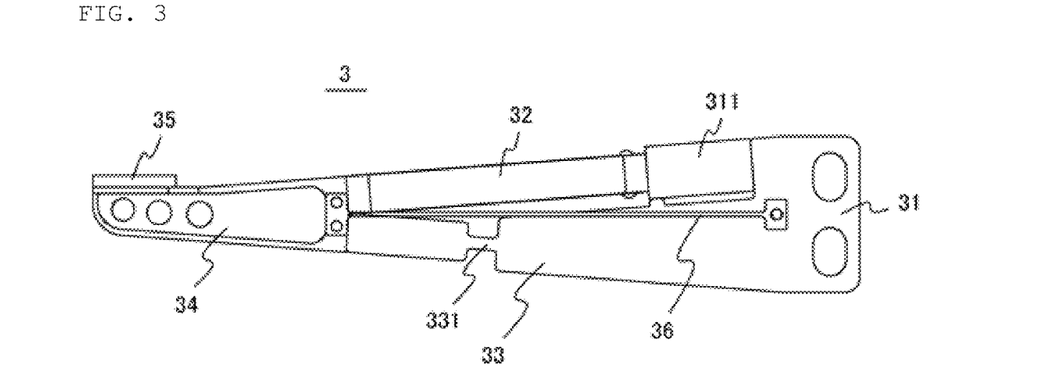
FIG. 3 is a view illustrating an actuator.

FIG. 3 is a view illustrating the actuator.

The actuator 3 includes a proximal portion 31 to be fixed to the valve seat plate, a piezoelectric element 32 having one end portion connected to an attachment face of the proximal portion 31 and extending in a first longitudinal direction, and a support portion 33 integrally formed with the proximal portion 31, arranged side-by-side with the piezoelectric element 32, and extending in a second longitudinal direction crossing the first longitudinal direction.

The actuator 3 also includes an operating portion 34 that is connected to the other end portion of the piezoelectric element 32 and to the distal end portion of the support portion 33, and is adapted to be displaced in a direction different from each of the first longitudinal direction and the second longitudinal direction along with the expansion and contraction of the piezoelectric element 32. The actuator 3 also includes a valve body 35 that is provided on one side face of the distal end side of the operating portion 34 along the displacement direction of the operating portion 34, and is adapted to be driven in response to a displacement of the operating portion 34.

The operating portion 34 of the actuator 3 is displaced in a displacement direction different from each of the first longitudinal direction and the second longitudinal direction within a plane substantially parallel with a plane including the first longitudinal direction and the second longitudinal direction along with the expansion and contraction of the piezoelectric element 32.

In addition, an intermediate portion of the support portion 33 extending in the second longitudinal direction is provided with a narrow portion 331 so that a displacement of the operating portion 34 that occurs along with the expansion and contraction of the piezoelectric element 32 can be magnified.

Herein, the proximal portion 31 and the support portion 33 can be integrally formed by blanking a metallic material, such as a stainless steel material including an invar material, for example.

Integrally forming the proximal portion 31 and the support portion 33 by blanking a metallic material can reduce the number of components used, and thus can simplify the assembly of the actuator 3.

A coupling member 311 made of an aluminum block, for example, can be attached to the attachment face of the proximal portion 31.

Attaching the coupling member 311, which is made of a material with a higher coefficient of linear expansion than that of the support portion 33, to the attachment face of the proximal portion 31, and attaching the piezoelectric element 32 to the proximal portion 31 via the coupling member 311 can reduce or eliminate the influence of thermal expansion or thermal shrinkage of the piezoelectric element 32 due to a temperature change.

Note that the coupling member 311 may be attached to not the attachment face of the proximal portion 31 but a portion between the piezoelectric element 32 and the operating portion 34.

The operating portion 34 can be formed using a lightweight material, such as an aluminum material, for example. Forming the operating portion 34 using a lightweight material, such as an aluminum material, is preferable for displacing the operating portion 34.

The valve body 35 may be made of rubber or the like, preferably, slippery rubber.

Note that the proximal portion 31 and the operating portion 34 of the actuator 3 can be coupled together using a compression member 36.

The piezoelectric element is likely to be damaged when a load is applied thereto in the tensile direction. However, coupling the proximal portion 31 and the operating portion 34 together using the compression member 36 allows the piezoelectric element 32 to be compressed in the first longitudinal direction. This can prevent damage to the piezoelectric element 32.

Figure 4:
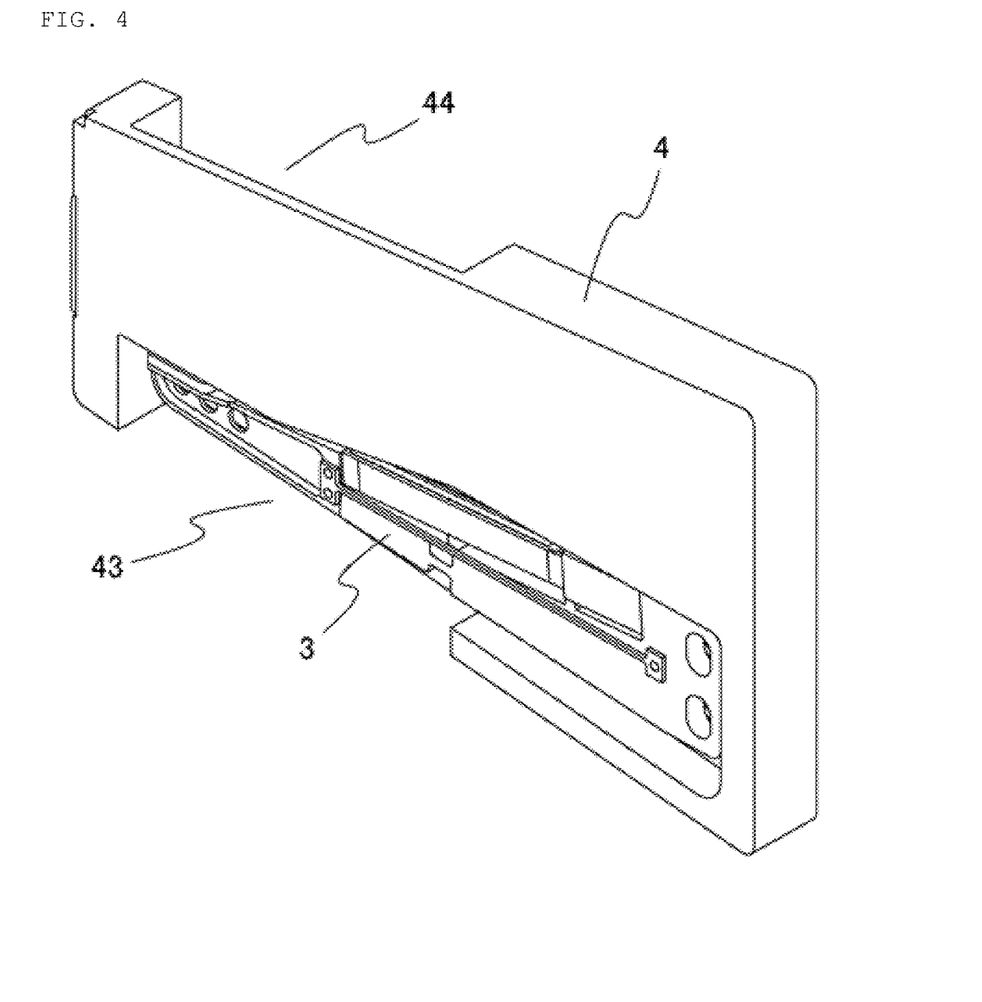
FIG. 4 is a perspective view of a state in which actuators are fixed to a first valve seat plate.
Figure 5:
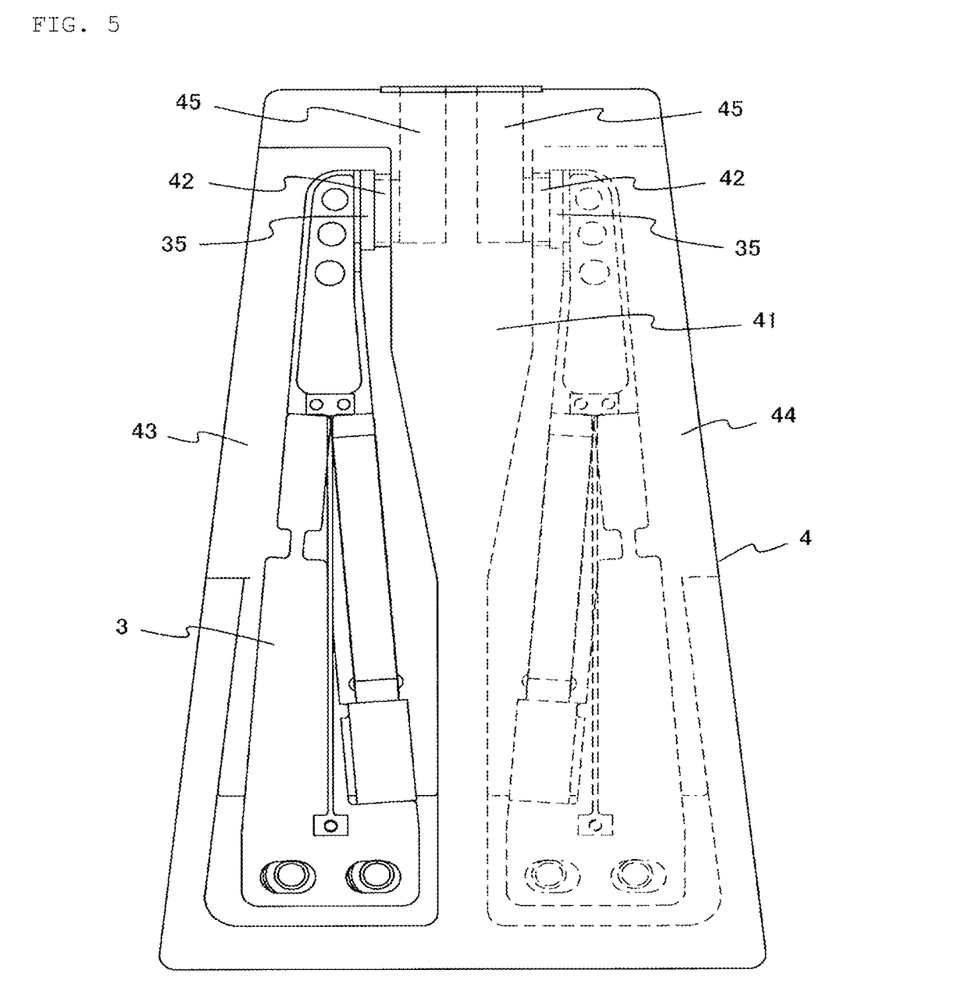
FIG. 5 is a view illustrating the state in which the actuators are fixed to the first valve seat plate.
Figure 6:
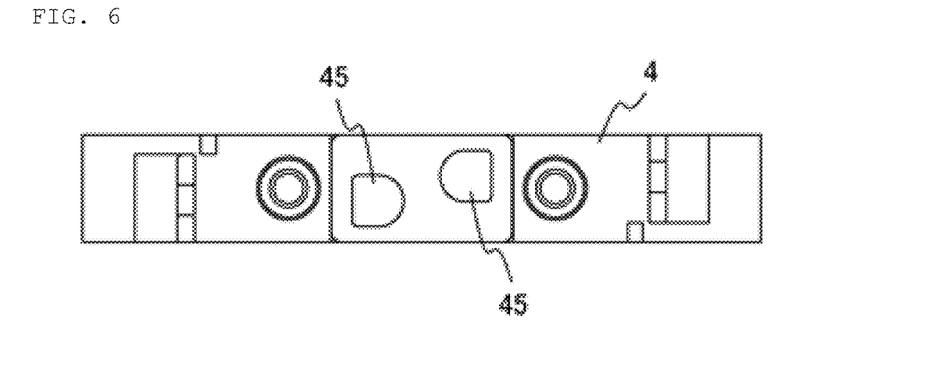
FIG. 6 is a view illustrating the state in which the actuators are fixed to the first valve seat plate.

FIG. 4 is a perspective view illustrating a state in which actuators are fixed to a first valve seat plate. FIG. 5 is a view illustrating the state in which the actuators are fixed to the first valve seat plate as seen from the side face side of the first valve seat plate. FIG. 6 is a view illustrating the state in which the actuators are fixed to the first valve seat plate as seen from the front face side of the first valve seat plate.

In the piezoelectric valve 1 of Embodiment 1 of the present invention, a first valve seat plate 4 having the actuators 3 fixed thereto is housed within the valve body 2.

The first valve seat plate 4 is an example of a valve seat plate to which two actuators can be attached. The first valve seat plate 4 has a valve seat portion 41 in its central portion. Each of opposite side faces of the valve seat portion 41 is provided with a valve seat 42 that is adapted to be contacted by the valve body 35 of each actuator 3.

An attachment portion 43 for the actuator 3 is formed on one face side of the first valve seat plate 4 at a position facing one side face of the valve seat portion 41.

Meanwhile, an attachment portion 44 for the actuator 3 is formed on the other face side of the first valve seat plate 4 at a position facing the other side face of the valve seat portion 41.

The two actuators 3 are respectively arranged in the attachment portions 43 and 44 of the first valve seat plate 4 and are fixed thereto with screws so that their respective valve bodies 35 face the respective valve seats 42.

The valve seat portion 41 has formed therein a plurality of discharge passages 45 that are open at the valve seat faces of the respective valve seats 42. Each discharge passage 45 is open at the front face (i.e., the top face in FIG. 5) of the first valve seat plate 4.

The first valve seat plate 4 is arranged in the valve body 2 in a state where the two actuators 3 are fixed to the first valve seat plate 4. As the front face of the first valve seat plate 4 is fixed to the valve body 2 with screws from the front face side of the valve body 2, the discharge passages 45 are allowed to communicate with the respective gas outlet ports that are open at the front face of the valve body 2.

In the piezoelectric valve 1, when a current is supplied to the piezoelectric element 32 of the actuator 3 in the closed-valve state, the piezoelectric element 32 stretches, causing the operating portion 34 to be displaced and thus causing the valve body 35 to be positioned away from the valve seat 42, so that the valve is opened. Accordingly, the piezoelectric valve 1 discharges compressed gas, which has been supplied to the valve body 2 from the gas supply port, from the gas outlet ports that are open at the front face of the valve body 2 via the discharge passages 45 formed in the valve seat portion 41 of the first valve seat plate 4.

Meanwhile, in the piezoelectric valve 1, when the supply of a current to the piezoelectric element 32 of the actuator 3 is stopped, the piezoelectric element 32 shrinks, causing the operating portion 34 to be displaced in the opposite direction and thus causing the valve body 35 to be seated on the valve seat 42, so that the valve is closed.

In the piezoelectric valve 1 of Embodiment 1 of the present invention, two first valve seat plates 4 are housed side-by-side in the width direction within the case of the valve body 2, and four gas outlet ports are open at the front face of the valve body 2.

In the piezoelectric valve 1 of Embodiment 1 of the present invention, each actuator 3 includes a displacement magnification mechanism with a simple structure. Thus, the thickness (width) dimension of the actuator 3 can be reduced than those of the conventional actuators.

Therefore, according to the piezoelectric valve 1 of Embodiment 1 of the present invention, the pitch of the gas outlet ports that are open at the front face of the valve body 2 can be reduced in comparison with those of the conventional piezoelectric valves.

In addition, in the piezoelectric valve 1 of Embodiment 1 of the present invention, each actuator 3 includes the support portion 33 integrally formed with the proximal portion 31. Thus, the number of components used can be reduced, and the assembly of the actuator 3 can be can simplified.

In the piezoelectric valve 1 of Embodiment 1 of the present invention, the first valve seat plate 4 includes the valve seat portion 41, and each of the opposite side faces of the valve seat portion 41 is provided with the valve seat 42. In addition, two actuators 3 are fixed to the first valve seat plate 4 such that their respective valve bodies 35 face the respective valve seats 42. Therefore, the thickness (width) dimension of the first valve seat plate 4, which has the two actuators 3 fixed thereto, can be reduced.

Therefore, according to the piezoelectric valve 1 of Embodiment 1 of the present invention, the pitch of the gas outlet ports that are open at the front face of the valve body 2 can be reduced in comparison with those of the conventional piezoelectric valves.

Herein, in the first valve seat plate 4, the valve seats 42 are provided on the opposite side faces of the valve seat portion 41 in a staggered manner such that the valve seats 42 partially overlap in the width direction. The two actuators 3 are fixed to the first valve seat plate 4 such that their respective valve bodies 35 face the respective valve seats 42.

Therefore, in the piezoelectric valve 1 of Embodiment 1 of the present invention, the two actuators 3 are attached to the first valve seat plate 4, specifically, on the opposite side faces of the valve seat portion 41 such that the actuators 3 partially overlap in the thickness (width) direction of the first valve seat plate 4. This can further reduce the thickness (width) dimension of the first valve seat plate 4 having the two actuators 3 fixed thereto, and thus can further reduce the pitch of the gas outlet ports that are open at the front face of the valve body 2 in comparison with those of the conventional piezoelectric valves.

Note that as illustrated in FIG. 6, the discharge passages 45 that are open at the front face of the first valve seat plate 4 are not aligned in the thickness (width) direction of the first valve seat plate 4 (i.e., the up-down direction in FIG. 6). However, it is possible to allow the plurality of gas outlet ports that are open at the front face of the valve body 2 to be aligned in the lateral direction by using an intermediate member including a plurality of internal flow channels that communicate with the openings of the respective discharge passages 45 at one face and are open at the other face while being aligned.

In addition, if the plurality of gas outlet ports that are open at the front face of the valve body 2 are not aligned in the thickness (width) direction of the valve body 2, it is possible to allow the plurality of gas outlet ports 52 that are open at the connector portion 5 to be aligned in the lateral direction by using an intermediate member including a plurality of internal flow channels that communicate with the openings of the respective gas outlet ports at one face and are open at the other face while being aligned.

Figure 7:
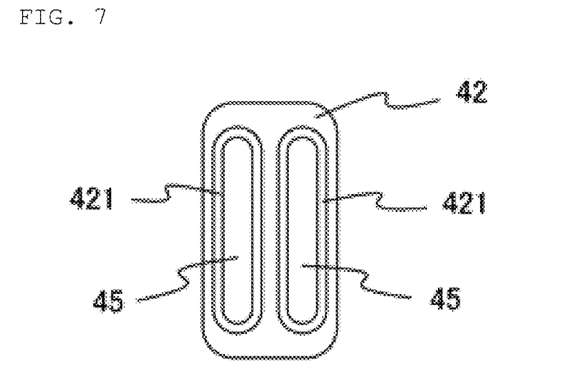
FIG. 7 is a view illustrating a valve seat face.

FIG. 7 is a view illustrating the valve seat face as seen from the front face side of the valve seat face.

Each valve seat 42 provided on the valve seat portion 41 of the first valve seat plate 4 includes a plurality of annular protruding portions 421. The valve seat 42 can have a valve seat face that allows the discharge passages 45 to be open within the respective annular protruding portions 421. Illustrated herein is an example in which the valve seat face includes two annular protruding portions 421. The discharge passages 45 that are open within the respective annular protruding portions 421 merge into a single discharge passage 45 in the valve seat portion 41.

In the actuator 3, the length of each of the operating portion 34 and the valve body 35 is preferably set short so that the operating portion 34 is stably displaced. In such a case, the length of the valve seat 42 needs also to be set short.

Herein, configuring the valve body 35 of the actuator 3 to move into contact with and away from the plurality of annular protruding portions 421 of the valve seat face can increase the entire circumferential length of the openings of the discharge passages 45 through which compressed gas is discharged from the valve body 2, and thus secure a necessary circumferential length. Consequently, it is possible to increase the amount of compressed gas discharged from the discharge passages 45 and thus secure a necessary discharge amount of the compressed gas while the valve body 35 and the valve seat 42 are positioned away from each other.

Embodiment 2

Figure 8:
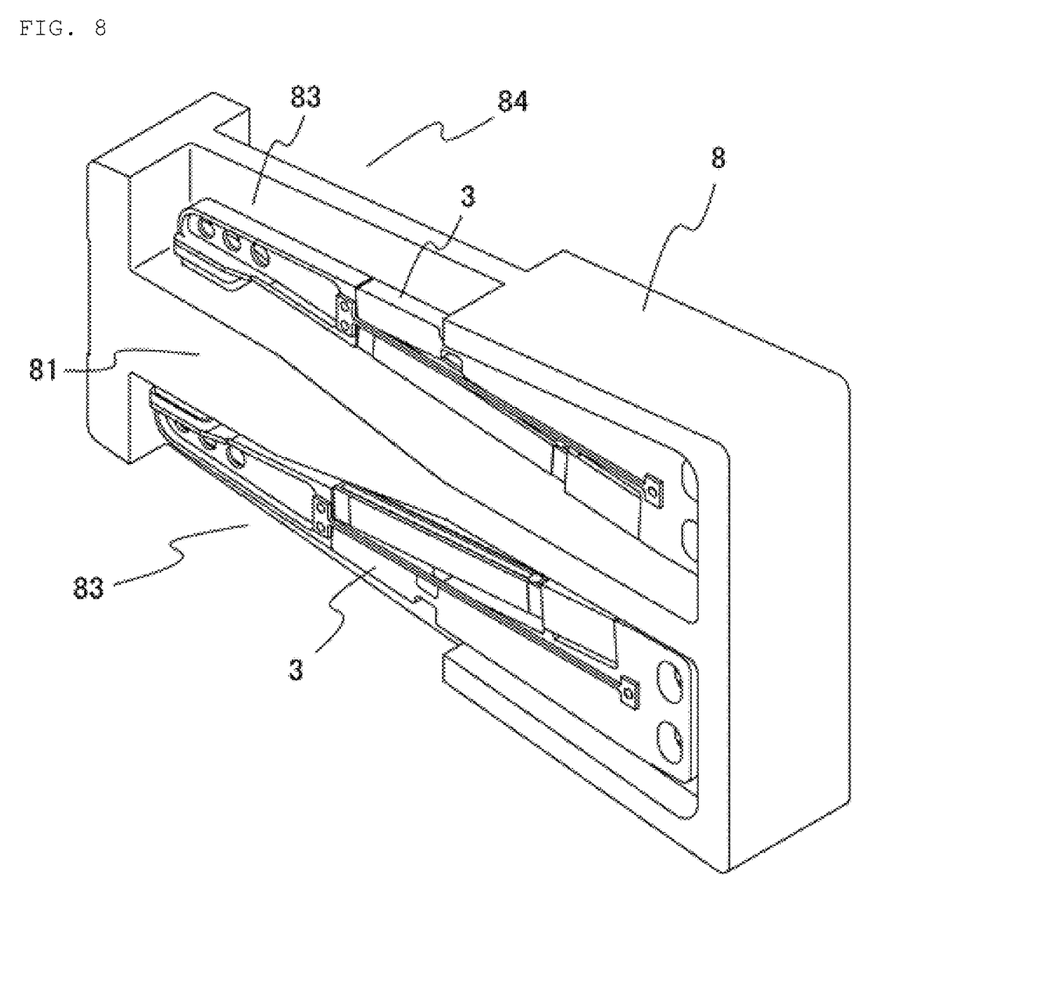
FIG. 8 is a perspective view of a state in which actuators are fixed to a second valve seat plate.
Figure 9:
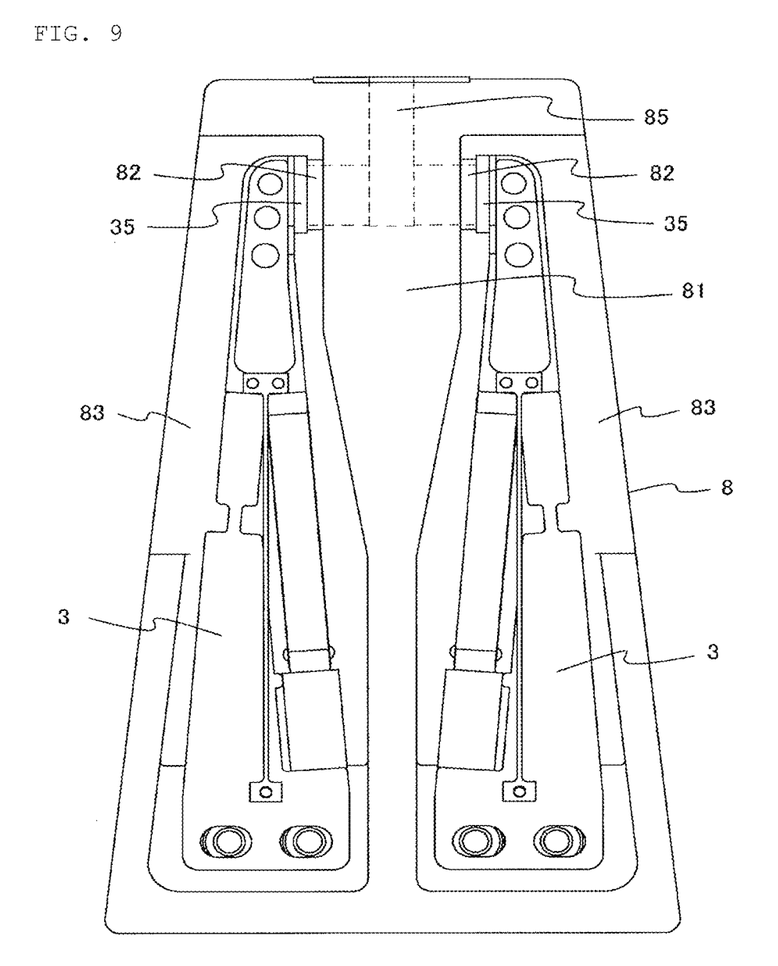
FIG. 9 is a view illustrating the state in which the actuators are fixed to the second valve seat plate.
Figure 10:
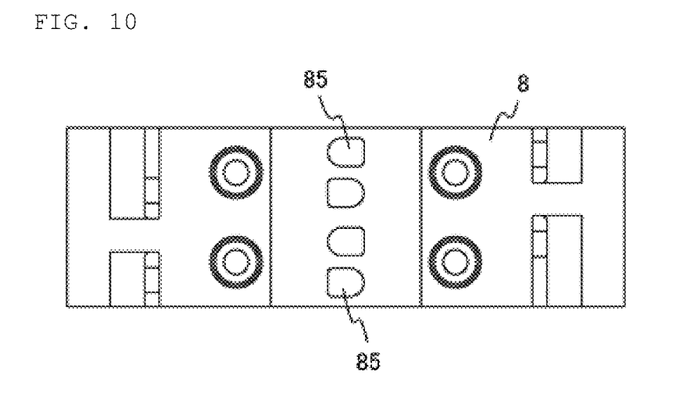
FIG. 10 is a view illustrating the state in which the actuators are fixed to the second valve seat plate.

FIG. 8 is a perspective view of a state in which actuators are fixed to a second valve seat plate. FIG. 9 is a view illustrating the state in which the actuators are fixed to the second valve seat plate as seen from the side face side of the second valve seat plate. FIG. 10 is a view illustrating the state in which the actuators are fixed to the second valve seat plate as seen from the front face side of the second valve seat plate.

In the piezoelectric valve 1 of Embodiment 2 of the present invention, a second valve seat plate 8 having the actuators 3 fixed thereto is housed within the valve body 2.

The second valve seat plate 8 is an example of a valve seat plate to which four actuators can be attached. The second valve seat plate 8 has a valve seat portion 81 in its central portion. Each of opposite side faces of the valve seat portion 81 is provided with a valve seat 82 that is adapted to be contacted by the valve body 35 of each actuator 3.

Attachment portions 83 for the actuators 3 are formed on one face side of the second valve seat plate 8 at positions facing the opposite side faces of the valve seat portion 81.

Meanwhile, attachment portions 84 for the actuators 3 are formed on the other face side of the second valve seat plate 8 at positions facing the opposite side faces of the valve seat portion 81.

The four actuators 3 are arranged in the attachment portions 83 and 84 of the second valve seat plate 8 and are fixed thereto with screws so that their respective valve bodies 35 face the respective valve seats 82.

The valve seat portion 81 has formed therein a plurality of discharge passages 85 that are open at the valve seat faces of the valve seats 82. Each discharge passage 85 is open at the front face (i.e., the top face in FIG. 9) of the second valve seat plate 8.

The second valve seat plate 8 is arranged in the valve body 2 in a state where the four actuators 3 are fixed to the second valve seat plate 8, and the front face of the second valve seat plate 8 is fixed to the valve body 2 with screws from the front face side of the valve body 2. This allows the discharge passages 85 to communicate with the respective gas outlet ports that are open at the front face of the valve body 2.

In the piezoelectric valve 1 of Embodiment 2 of the present invention, a single second valve seat plate 8 is housed within the case of the valve body 2, and four gas outlet ports are open at the front face of the valve body 2.

The piezoelectric valve 1 of Embodiment 2 of the present invention also includes the actuators 3 as with the piezoelectric valve 1 of Embodiment 1, and can have a smaller pitch of the gas outlet ports that are open at the front face of the valve body 2 in comparison with those of the conventional piezoelectric valves.

In the piezoelectric valve 1 of Embodiment 2 of the present invention, the assembly of the actuators 3 is also simplified.

In the piezoelectric valve 1 of Embodiment 2 of the present invention, the second valve seat plate 8 includes the valve seat portion 81, and each of the opposite side faces of the valve seat portion 81 is provided with the valve seat 82. In addition, four actuators 3 are fixed to the opposite faces (two on each side) of the second valve seat plate 8 such that their respective valve bodies 35 face the respective valve seats 82. Thus, the thickness (width) dimension of the second valve seat plate 8, which has the four actuators 3 fixed thereto, can be reduced.

Therefore, according to the piezoelectric valve 1 of Embodiment 2 of the present invention, the pitch of the gas outlet ports that are open at the front face of the valve body 2 can also be reduced in comparison with those of the conventional piezoelectric valves.

Herein, in the second valve seat plate 8, the valve seats 82 are also provided side-by-side on the opposite side faces of the valve seat portion 81 in a staggered manner such that the valve seats 82 partially overlap in the width direction as in the first valve seat plate 4. The four actuators 3 can be fixed to the second valve seat plate 8 such that their respective valve bodies 35 face the respective valve seats 82.

According to the piezoelectric valve 1 of Embodiment 2 of the present invention, the four actuators 3 can also be attached to the second valve seat plate 8, specifically, on the opposite side faces of the valve seat portion 81 such that the actuators 3 partially overlap in the thickness (width) direction of the second valve seat plate 8. This can further reduce the thickness (width) dimension of the second valve seat plate 8 having the four actuators 3 fixed thereto, and thus can further reduce the pitch of the gas outlet ports that are open at the front face of the valve body 2 in comparison with those of the conventional piezoelectric valves.

Note that in such a case, the discharge passages 85 that are open at the front face of the second valve seat plate 8 are not aligned in the thickness (width) direction of the second valve seat plate 8 (i.e., the up-down direction in FIG. 10). However, using an intermediate member as in the first valve seat plate 4 can allow the plurality of gas outlet ports that are open at the front face of the valve body 2 or the gas outlet ports 52 that are open at the connector portion 5 to be aligned in the lateral direction.

In the foregoing embodiment of the present invention, the piezoelectric valve is configured such that the valve body is seated on the valve seat in a state where no voltage is applied to the piezoelectric element. However, changing the polarity of a voltage supplied from a drive unit, for example, can allow the valve body to be positioned away from the valve seat in a state where no voltage is applied to the piezoelectric element.

In the foregoing embodiment of the present invention, the piezoelectric valve is configured such that four actuators are arranged in the case of the valve body, and four gas outlet ports are open at the front face of the valve body. However, the present invention is not limited thereto, and one or more actuators can be arranged in the valve body.

Although the foregoing embodiment of the present invention has exemplarily illustrated two valve seat plates, the valve seat plates are not limited thereto. For example, two attachment portions for actuators can be formed only on one face side of the second valve seat plate 8.

Although the embodiments of the present invention have been described above, the present invention is not limited thereto, and its configuration can be changed as appropriate within the scope of the invention.

INDUSTRIAL APPLICABILITY

In a piezoelectric valve of an embodiment of the present invention, the pitch of gas outlet ports of a body case can be reduced in comparison with those of the conventional piezoelectric valves. Thus, the piezoelectric valve can be used for various applications, such as an ejector valve of an optical sorter designed to sort grains, for example.

REFERENCE SIGNS LIST

1 Piezoelectric valve
2 Valve body
3 Actuator
31 Proximal portion
311 Coupling member
32 Piezoelectric element
33 Support portion
331 Narrow portion
34 Operating portion
35 Valve body
36 Compression member
4 First valve seat plate
41 Valve seat portion
42 Valve seat
421 Annular protruding portion
43 Attachment portion
44 Attachment portion
45 Discharge passage
5 Connector portion
51 Gas inlet port
52 Gas outlet port
6 Cover body
61 Wire connector
8 Second valve seat plate
81 Valve seat portion
82 Valve seat
83 Attachment portion
84 Attachment portion
85 Discharge passage

The invention claimed is:

1. A piezoelectric valve comprising:
a plurality of actuators that respectively drive a plurality of valve bodies, the plurality of valve bodies individually driven in parallel planes;
a valve seat plate including a plurality of valve seats and a plurality of discharge passages, each of the valve seats of the plurality of valve seats are respectively adapted to be positioned in contact with and away from the plurality of valve bodies individually, and the valve seat plate having the plurality of actuators fixed thereto; and
a body case that houses the valve seat plate,
wherein:
each of the plurality of actuators includes
a proximal portion fixed to the valve seat plate,
a piezoelectric element having one end portion connected to an attachment face of the proximal portion and extending in a first longitudinal direction,
a support portion integrally formed with the proximal portion, the support portion being arranged side-by-side with the piezoelectric element and extending in a second longitudinal direction crossing the first longitudinal direction,
an operating portion connected to another end portion of the piezoelectric element and to a distal end portion of the support portion, the operating portion being adapted to be displaced in a displacement direction different from each of the first longitudinal direction and the second longitudinal direction along with expansion and contraction of the piezoelectric element, and the valve body provided on a side of the operating portion along the displacement direction, the valve body being adapted to be driven in response to a displacement of the operating portion, and the body case includes
- a gas supply port through which compressed gas is supplied, and
- a plurality of gas outlet ports that individually discharge the compressed gas supplied from the gas supply port via the respective discharge passages of the valve seat plate while the plurality of valve bodies and the plurality of valve seats are respectively positioned away from each other.

2. The piezoelectric valve according to claim 1, wherein:
the valve seat plate includes a valve seat portion having the valve seats and the discharge passages formed therein, the plurality of valve seats being provided on opposite sides of the valve seat portion, and
the plurality of actuators are fixed to the valve seat plate such that the valve bodies of the respective actuators face the respective valve seats.

3. The piezoelectric valve according to claim 1, wherein:
the valve seat plate includes a valve seat portion having the valve seats and the discharge passages formed therein, the plurality of valve seats being provided on opposite sides of the valve seat portion in a staggered manner such that the valve seats partially overlap in a width direction, and
the plurality of actuators are fixed to the valve seat plate such that the valve bodies of the respective actuators face the respective valve seats.

4. The piezoelectric valve according to claim 1, wherein the support portion includes an intermediate portion extending in the second longitudinal direction, the intermediate portion having a portion that is narrower than other portions of the intermediate portion.

5. The piezoelectric valve according to claim 1, wherein:
the valve seat includes a valve seat face having a plurality of annular protruding portions in which the respective discharge passages are open, and
the valve body is adapted to move into contact with and away from the plurality of annular protruding portions of the valve seat face.

6. A piezoelectric valve comprising:
an actuator that drives a valve body;
a valve seat plate including a valve seat and a discharge passage, the valve seat is adapted to be positioned in contact with and away from the valve body, and the valve seat plate having the actuator fixed thereto; and
a body case that houses the valve seat plate,
wherein:
the actuator includes
- a proximal portion fixed to the valve seat plate,
- a piezoelectric element having one end portion connected to an attachment face of the proximal portion and extending in a first longitudinal direction,
- a support portion integrally formed with the proximal portion, the support portion being arranged side-by-side with the piezoelectric element and extending in a second longitudinal direction crossing the first longitudinal direction,
- an operating portion connected to another end portion of the piezoelectric element and to a distal end portion of the support portion, the operating portion being adapted to be displaced in a direction different from each of the first longitudinal direction and the second longitudinal direction along with expansion and contraction of the piezoelectric element, and
- the valve body provided on a side of the operating portion along the displacement direction, the valve body being adapted to be driven in response to a displacement of the operating portion, and the body case includes
- a gas supply port through which compressed gas is supplied, and
- a gas outlet port that discharges the compressed gas supplied from the gas supply port via the discharge passage of the valve seat plate while the valve body and the valve seat are positioned away from each other.

\* \* \* \* \*